(12) United States Patent
Nelson et al.

(10) Patent No.: US 7,665,908 B2
(45) Date of Patent: Feb. 23, 2010

(54) INTEGRATING OPTOELECTRONIC COMPONENTS INTO A MOLDED COMMUNICATIONS MODULE HAVING INTEGRATED PLASTIC CIRCUIT STRUCTURES

(75) Inventors: Stephen T. Nelson, Santa Clara, CA (US); Donald A. Ice, Milpitas, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/958,068

(22) Filed: Dec. 17, 2007

(65) Prior Publication Data

US 2008/0145060 A1      Jun. 19, 2008

Related U.S. Application Data

(60) Provisional application No. 60/870,329, filed on Dec. 15, 2006.

(51) Int. Cl.
  *G02B 6/36*    (2006.01)
(52) U.S. Cl. .............................. 385/92; 385/14; 385/53; 385/88; 385/94
(58) Field of Classification Search ............. 385/92–94, 385/88–89, 14, 53; 372/36; 174/50
See application file for complete search history.

(56) References Cited

U.S. PATENT DOCUMENTS

| 4,986,848 | A  | * | 1/1991 | Yamamoto et al. | ......... 106/1.11 |
|---|---|---|---|---|---|
| 6,878,875 | B2 | * | 4/2005 | Aronson et al. | ................ 174/50 |
| 7,061,949 | B1 | * | 6/2006 | Zhou et al. | .................. 372/36 |
| 7,160,039 | B2 | * | 1/2007 | Hargis et al. | .................. 385/93 |
| 7,264,408 | B2 | * | 9/2007 | Togami et al. | ................ 385/92 |
| 2006/0192221 | A1 | * | 8/2006 | Zhou et al. | .................... 257/98 |

* cited by examiner

*Primary Examiner*—Brian M. Healy
*Assistant Examiner*—Guy G Anderson
(74) *Attorney, Agent, or Firm*—Workman Nydegger

(57) ABSTRACT

Integrated optical subassemblies (OSA) such as integrated transmit and receive optical subassemblies that may be implemented with an optical transceiver module that includes a molded body. The integrated OSA includes a mounting surface defined on a vertical portion of the molded body, a wall extending about the mounting surface, at least one optoelectronic device, such as a laser diode or a photodiode mounted on a transimpendence amplifier, positioned on the mounting surface, a plurality of bond pads included on the mounting surface in electrical connection with the at least one optoelectronic device, a plurality of conductive feedthroughs defined through the mounting surface, each feedthrough being in electrical communication with a corresponding one of the bond pads; and an optical fiber port that engages the wall extending about the mounting surface, wherein the optical fiber port is configured for receiving an optical fiber cable.

22 Claims, 7 Drawing Sheets

INTEGRATING OPTOELECTRONIC COMPONENTS INTO A MOLDED COMMUNICATIONS MODULE HAVING INTEGRATED PLASTIC CIRCUIT STRUCTURES

CROSS-REFERENCE TO RELATED APPLICATIONS

This application claims the benefit of U.S. Provisional Application No. 60/870,329, filed Dec. 15, 2006, which is incorporated herein by reference in its entirety.

BACKGROUND

1. Technology Field

The present invention generally relates to communications modules. In particular, the present invention relates to a communications module, such as an optical transceiver module, that is integrally fabricated so as to reduce part count and simplify construction and design, and that includes an integrated solution for incorporating optoelectronic components into the transceiver module itself.

2. The Related Technology

Traditionally designed optical transceiver modules typically include several components, including one or more optical subassemblies, a printed circuit board with associated electronic circuitry, and a shell supporting the printed circuit board. Though proven, this design nevertheless compels various compromises to be tolerated, due to limitations inherent in the above-mentioned components and their respective interconnections.

In light of this, a need exists in the art for a communications module, such as an optical transceiver module, that includes improvements that provide simplification of design and part count reduction while improving device reliability. Further, a need exists for providing enhanced and simplified options for incorporating optoelectronic components, such as laser diodes and photodiodes, into the design of a transceiver configured to overcome the above needs.

BRIEF SUMMARY

Embodiments disclosed herein relate to an integrated optical subassembly (OSA) such as integrated transmit and receive optical subassemblies that may be implemented with an optical transceiver module that includes a molded body. The integrated OSA includes a mounting surface defined on a vertical portion of the molded body, a wall extending about the mounting surface, at least one optoelectronic device, such as a laser diode or a photodiode mounted on a transimpedance amplifier, positioned on the mounting surface, a plurality of bond pads included on the mounting surface in electrical connection with the at least one optoelectronic device, a plurality of conductive feedthroughs defined through the mounting surface, each feedthrough being in electrical communication with a corresponding one of the bond pads; and an optical fiber port that engages the wall extending about the mounting surface, wherein the optical fiber port is configured for receiving an optical fiber cable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
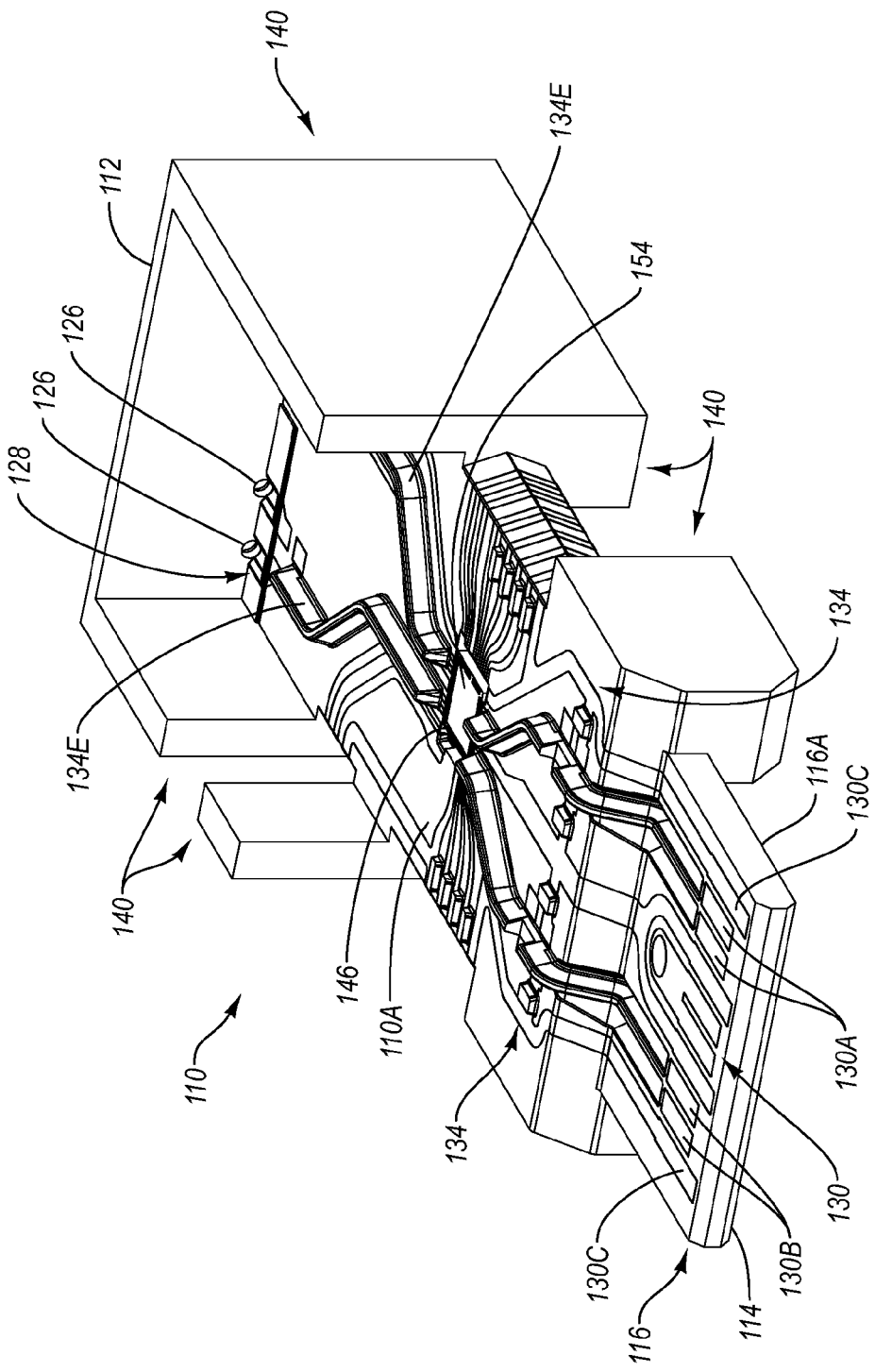
FIG. 1A is a perspective top view of portions a molded communications module that serves as one environment wherein embodiments of the present invention can be practiced.

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. It is also understood that reference to a "first", or a "second" etc. element (such as a first and second plurality of bond pads) in this description and in the claims is meant to distinguish one element from another and is not meant to imply sequential ordering unless explicitly stated.

FIGS. 1-6 depict various features of embodiments of the present invention, which are generally directed to modes of integrating optoelectronic components with a molded communications module. The molded communications module in one embodiment is an optical transceiver module. The optoelectronic component integration depicted and described herein results in a reduction in the number of parts and overall device complexity, thereby simplifying transceiver design and speeding production. Moreover, the present design eliminates the need for not only discrete optical subassemblies, but also intervening structures traditionally used to interconnect such subassemblies with the transceiver.

1. Exemplary Environment for Optoelectronic Component Integration with a Molded Communications Module Reference is first made to FIGS. 1A, 1B, and 2, which depict various details regarding one device embodiment wherein features of the present invention can be practiced. These figures show one type of communications module that can benefit from the teachings of the present invention. In particular, an optical transceiver module ("transceiver"), generally designated at 100, is shown as an exemplary communications module including aspects of one embodiment of the present invention.

As shown, the transceiver 100 is implemented as having a form factor and configuration conforming to a Small Form Factor Pluggable ("SFP") standard, as defined by applicable Multi-Source Agreements ("MSAs") standard in the industry. However, it should be noted that transceivers and other communications modules that differ in form factor, operational configuration, or other aspects can also benefit from the principles discussed herein. Indeed, modules such as 10 Gigabit Small Form Factor Pluggable ("XFP") transceivers having varying form factors and data rates can also employ features of the embodiments to be described herein. The following discussion is therefore not meant to limit the scope of the present invention in any way.

As shown, the transceiver 100 includes a body 110 that is formed by standard injection molding or other suitable molding process. As such, the transceiver body is also referred to herein as a "molded module." As will be described, the body 110 serves multiple purposes within the transceiver 100 that were formerly performed by multiple components, and as such simplifies transceiver design by serving as an integrated component.

The transceiver body 110 is composed of a suitable material to enable the formation of conductive features on the body in the manner described below. In one embodiment, the body 110 is composed of a plastic resin, such as a liquid crystal polymer, having a catalyst intermixed therewith. In one embodiment, the catalyst is composed substantially of palladium, but other suitable materials offering the same functionality could alternatively be used. As mentioned, this material composition for the transceiver body enables conductive features to be defined on the body, as will be described further below.

The transceiver body 110 further includes a top body surface 110A and bottom body surface 110B, and defines a front end 112 and back end 114. The back portion of the body 110 proximate the back end 114 defines an edge connector 116 that enables the transceiver 100 to operably connect with a host device (not shown). The edge connector 116 itself defines a top surface 116A and bottom surface 116B. Note that the edge connector 116 has a height that is relatively less than that of other portions of the body 110, in conformance with industry-defined standards for such an interface.

Figure 2:
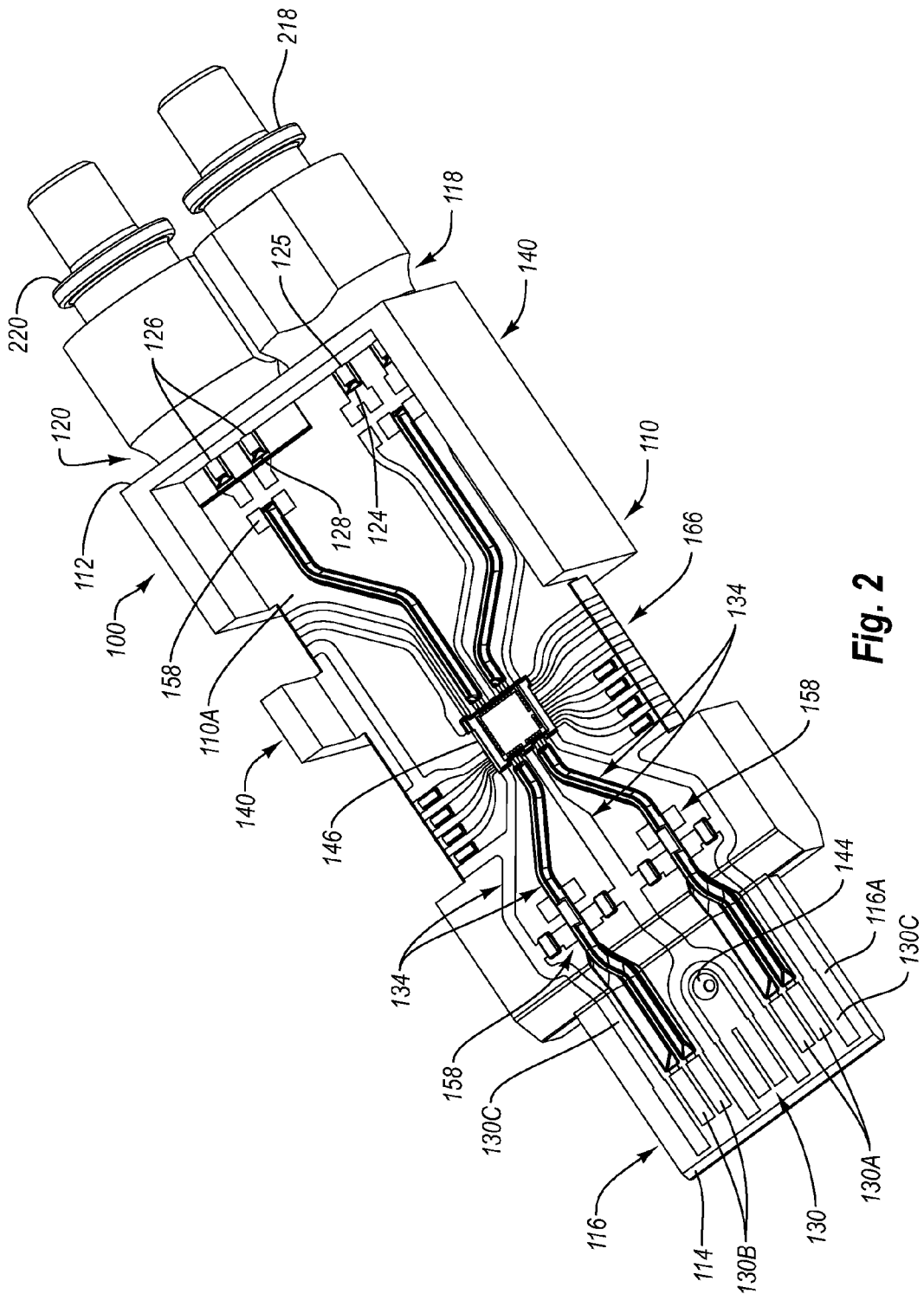
FIG. 2 is a perspective top view of the molded communications module of FIG. 1A, having a pair of optical ports operably attached thereto.

As seen in FIG. 2, the transceiver 100 includes an integrated transmitter subassembly ("ITS") 118 and an integrated receiver subassembly ("IRS") 120 that are each integrated into the transceiver body 110. The ITS 118 and IRS 120 each include optoelectronic and other related components, to be discussed below, that are critical to the functionality of the transceiver 100 in producing and receiving optical signals in connection with a communications network. Moreover, the ITS 118 and IRS 120 represent a departure from commonly known optical subassemblies, such as a transmitter optical subassembly ("TOSA") and a receiver optical subassembly ("ROSA") that are typically separate from and attached to the body of optical transceiver to enable the transmission and reception of optical signals. In the present design, the ITS 118 and IRS 120 respectively replace a standard TOSA and ROSA, and while providing the same functionality, offer several advantages over typical optical subassembly configurations. These advantages will become more apparent as details relating to the ITS 118 and IRS 120 are disclosed further below.

Inspection of FIGS. 1A-2 reveals that the present transceiver design differs from previously known designs in that a printed circuit board, traditionally included within a transceiver shell, is not present. Instead, the molded transceiver body integrally serves the functionality previously performed by the printed circuit board and shell. In particular, the conductive contact pads, traces, and electronic components traditionally found on a transceiver printed circuit board are now included on the top and bottom surfaces 110A and 110B of the transceiver body 110. Further, the structure of the transceiver body 110 is configured such that it also performs the functionality traditionally performed by a discrete shell in housing the printed circuit board and other transceiver components. Thus, significant consolidation and integration of formerly discrete transceiver components is realized via the present transceiver configuration. Further, use of the present transceiver body enables the inclusion of various surface features and three-dimensional structures to be included thereon, as will be described.

Figure 3:
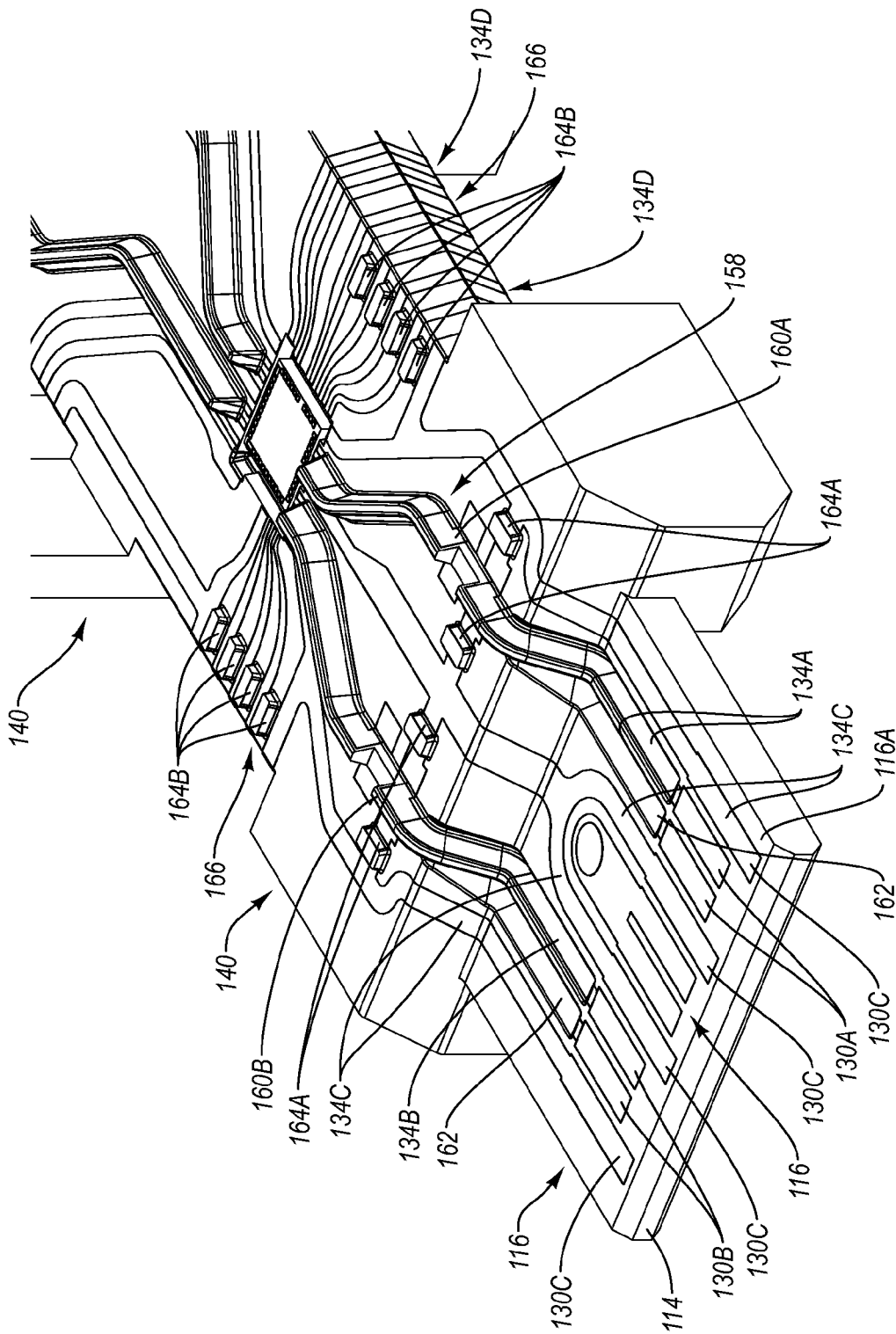
FIG. 3 is a close-up perspective top view of the molded communications module of FIG. 1A, showing various details thereof.

Together with FIGS. 1A-2, reference is now made to FIG. 3, showing various further details of the transceiver 100. A plurality of contact pads 130 are included on both the top and bottom surfaces 116A and B of the edge connector 116 for interfacing with corresponding pads or conductive features of the host device (not shown). Among these pads are disposed a first data signal pad pair 130A and a second data signal pad pair 130B that each facilitate the transfer of high speed data signals between the host device and the transceiver 100. Additionally, a plurality of conductive traces 134 are also included on the transceiver body 110 and operably connect with corresponding contact pads 130 on both the top and bottom surfaces 116A and B of the edge connector 116 to enable the transfer of various signals in the transceiver 100. Among these traces are disposed a first data signal trace pair 134A and a second data signal trace pair 134B that each operably connect with the corresponding first or second data signal pad pairs 130A or 130B of the edge connector 116. Also included are ground traces 134C that operably connect with corresponding ground contact pads 130C on the edge connector 116.

The conductive contact pads 130 and traces 134 are defined on the surface of the transceiver body 110 by a process known as laser direct structuring, wherein a guided laser is employed during transceiver body manufacture in etching the surfaces of the body 110 where conductive features such as the contact pads and traces are to be located. Laser etching in this manner removes several microns of the plastic resin body material at the surface thereof, which exposes and activates the palladium catalyst imbedded in the plastic resin. So prepared, placement of the body 110 in an electroless plating bath causes copper or other suitable component of the bath to adhere to the laser etched portions of the body, thereby forming the contact pads 130, traces 134 and other conductive features described below on the body.

Formation of conductive features on a catalyst-containing plastic resin using the laser direct structuring process as described above yields a product also known as and referred to herein as a "plastic circuit." This process and technology is owned and licensed by LPKF Laser and Electronics AG, Germany, http://www.lpkf.com/. Products formed by this process are generally known as molded interconnect devices ("MID"'s).

Should the particular path, shape, or other configuration of the contact pads 130, traces 134, or other conductive features need to be altered for a transceiver body yet to be manufactured, the laser need simply be reprogrammed to etch the body surface in accordance with the desired change. In this way, reconfiguration of the conductive features of the transceiver body is readily achieved without significant expense or time.

In accordance with embodiments of the present invention, the transceiver body 110 can be configured to include various surface features serving various purposes for the transceiver 100. These surface features give the transceiver body 110 a three dimensional ("3-D") aspect that is not possible with known transceivers and other communication modules employing standard printed circuit boards ("PCBs"). The transceiver body configured to include the 3-D features to be described below is also referred to herein as a "3-D MID."

A first 3-D feature is shown on the transceiver body 110 as a plurality of various body extensions 140 that are formed as a result of the injection molded design of the body. The body extensions 140 serve various purposes in connection with the structure and functionality of the transceiver 100, such as providing structural bracing or spacing, and surfaces for engagement with a cover to provide a housing (not shown) for the transceiver, for instance. In one embodiment, the body extension 140 (seen in FIG. 2) proximate the ITS 118 and IRS 120 can be plated or otherwise covered with conductive material via the laser direct structuring or other suitable process in order to reduce or prevent the emission of EMI from the transceiver 100. In other embodiments, other surfaces of the transceiver 100 can also be conductively plated to reduce EMI emission.

Figure 1B:
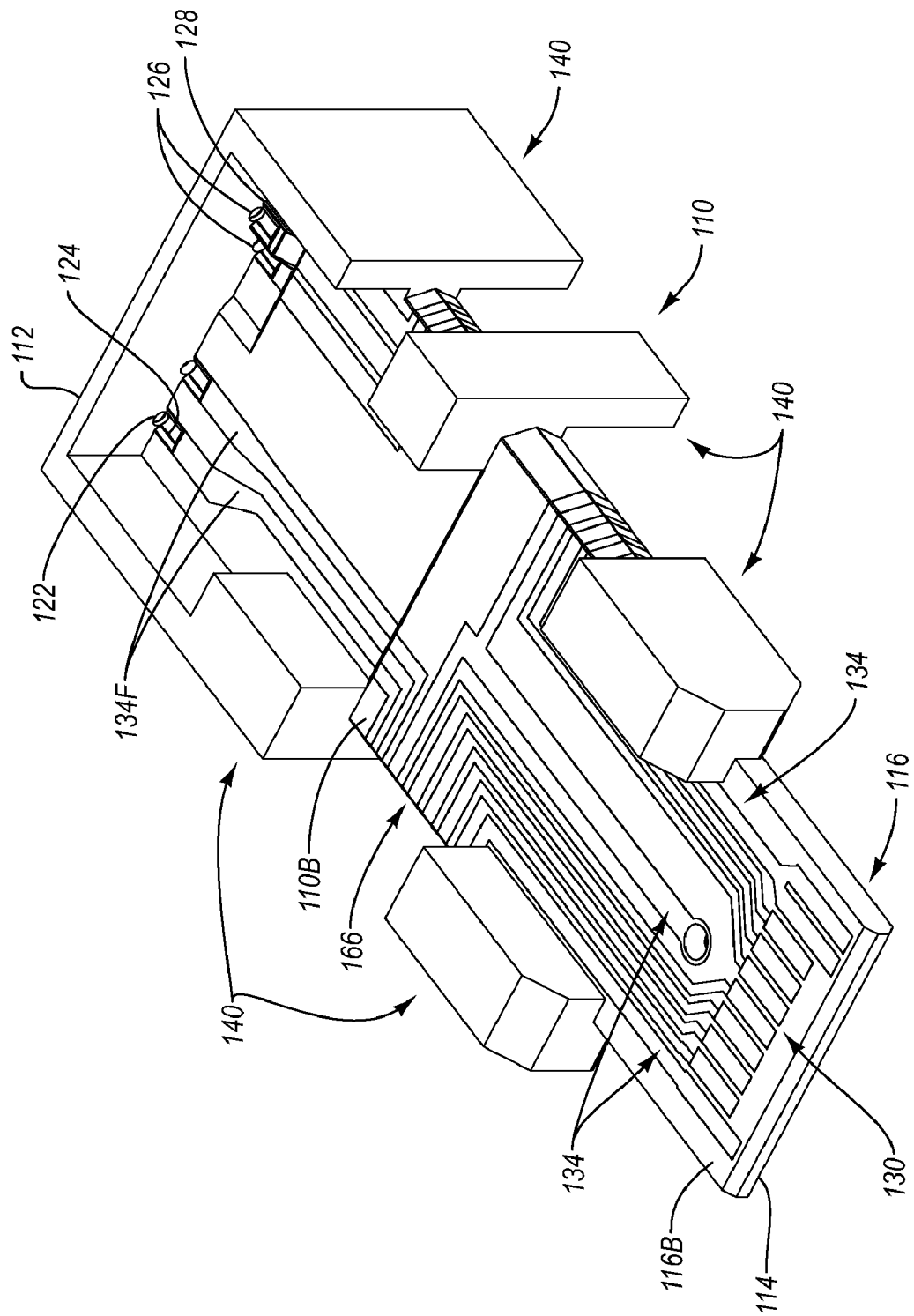
FIG. 1B is a perspective bottom view of the molded communications module of FIG. 1A.

Another 3-D feature of the transceiver body 110 is shown at 144, wherein a hole, or via, is defined through the body so as to extend from the top body surface 110A to the bottom surface 110B. The via 144 enables signals transmitted on selected traces 134 to be transferred from one body surface to another, as best shown in FIGS. 1A and 1B. Note that the interior surface of the via 144 is slanted with respect to the top and bottom body surfaces 110A, B. This is to enable sufficient laser etching to be performed on the via 144 so that a conductive material may be applied thereto. Generally, the slant of such surfaces should be no greater than about 75 degrees from a plane define by the top or bottom body surface 110A or 110B. More generally, the slant is determined by the requirements of the particular laser etching equipment used. Note that many such vias can be defined in the transceiver body 110.

A component pocket 146 is defined on the top body surface 110A, as best shown in FIG. 1A, as yet another possible 3-D feature made possible by the transceiver body 110 configured in accordance with one embodiment. The component pocket 146 is sized and configured to receive therein an integrated circuit chip or other electronic or optoelectronic component. In the illustrated embodiment, an integrated laser driver/post amplifier/controller ("LDPA controller") 150 is shown in FIGS. 2 and 3 as residing within the component pocket 146.

The floor of the component pocket 146 includes a conductive pad 154 that is configured to electrically connect with the LDPA controller 150, either through wirebonds (not shown), an electrically conductive pad on the underside of the LDPA controller 150, or other electrical connective scheme when it is disposed in the component pocket 146. The conductive pad 154 in turn is electrically connected to one or more of the traces 134 that extend to the component pocket 146, such as the ground traces 134C in the present embodiment. The LDPA controller 150 is secured within the component pocket 146 with a conductive adhesive in one embodiment, or by solder paste or other suitable securing substance.

Note that, because the component pocket 146 is sunken with respect to the top body surface 110A, a top surface of the LDPA controller 150 when placed in the pocket is positioned substantially level with the top body surface 110A. This enables electrical connections of minimum length to be established between selected traces 134 that terminate at the component pocket 146 and conductive pads positioned on the LDPA controller 150. These electrical connections in the present embodiment are achieved by the use of wire bonds (not shown). As improved signal transmission is achieved with wire bonds when the wire bond length is minimized, the minimization of length between the terminations of the traces 134 proximate the component pocket 146 and the pads of the LDPA controller 150 advantageously operates to improve signal transmission—especially high frequency signals—between the two structures. Once placement, securing, and wire bonding of the LDPA controller 150 within the component cavity 146 is complete, the controller can be covered with epoxy to prevent damage to the controller or wire bonds.

Note that one or more component pockets 146 having varying sizes, depths, and particular configurations can be disposed at various locations on the top and bottom body surfaces 110A/B to receive multiple components as may be needed for a particular application. Also, though shown here with an LDPA controller, any one of various different components may be placed in this or other component pockets defined on the molded transceiver body. Further, more than one component may be received in each component pocket.

As best seen in FIG. 2, the molded transceiver body 110 includes a plurality of additional component pads 158 that, like the component pad 154 of the component pocket 146, enable the electrical connection of various electronic components to the body. Such electronic components can include capacitors, resistors, etc.

As yet another example of 3-D featuring of the molded transceiver body 110, a plurality of vertical ridges 160 are defined on the body so as to enable conductive traces to be defined thereon. In particular, a first ridge 160A having the data signal trace pair 134A disposed thereon, and a second ridge 160B having the data signal trace pair 134B disposed thereon are shown. The traces of each pair 134A and 134B are disposed on opposing sides of the respective ridges 160A and 160B. This configuration enables the traces of each pair to effectively couple with one another, thereby controlling their respective impedance, i.e., creating a differential impedance known as "broadside coupling," and preserving the quality of the data signals transmitted therethrough. Such a configuration compensates for the fact that no ground exists in the transceiver body 110 as would typically exist for coupling purposes in a standard printed circuit board.

Two troughs 162 as additional 3-D features are included on the transceiver body, defined on the top surface 116A of the edge connector 116 such that a back portion of each ridge 160A and 160B is positioned in the respective trough. So configured, the troughs 162 enable the ridges 160A and 160B to extend into the edge connector 116 in such a way as to not exceed the industry-defined 1 mm height restriction for this style of edge connector. Note that the rear termination of the troughs 162 corresponds with the point at which the data signal traces pairs 134A and 134B electrically connect with the corresponding data signal pads 130A and 130B, respectively.

Yet another 3-D feature of the molded transceiver body 110 is a plurality of trace interconnection features 164 located at various points on the transceiver body. These trace interconnection features 164 are employed to temporarily interconnect the various traces 134 one with another during the transceiver manufacturing process. Once interconnection between the traces 134 is no longer needed, the trace interconnection features 164 can be modified such that trace interconnection is eliminated.

Further note that the traces 134 disposed on the transceiver body 110 can pass between the bottom and top body surfaces 110A and 110B around the edges of the transceiver body, such as at locations 166. This is another feature not possible with standard printed circuit board technology.

Note that the transceiver body 110 is not limited to a single thickness, as is common with known printed circuit boards, but rather can be configured to have various 3-D surface features and thicknesses as may be needed or desired for a particular application. Thus, instead of a 1 mm thick printed circuit board in accordance with the thickness required for the edge connector, the transceiver body can have a plurality of thicknesses and configurations along its length on either the top, bottom, or other surface thereof.

A transceiver made in accordance with the principles presented herein includes relatively fewer parts than similar known transceiver designs, which yields a simpler, more stable and lower cost system. This in turn increases the potential for high volume production of such a transceiver. Further, the present transceiver does not suffer from the limitations described herein that are typically associated with known printed circuit boards. Transceiver design freedom is also greatly enhanced as a result of practice of the above embodiments.

2. Structural and Operational Aspects of Integrated Transmitter and Receiver Subassemblies in a Molded Communications Module With continuing reference to FIGS. 1-3, reference is now made to FIGS. 4 and 5 in describing various features regarding embodiments of the present invention. As briefly described above, suitable electrical connections between traditional transmitter and receiver optical subassemblies and other portions of the transceiver, such as a printed circuit board, are often difficult to achieve and require the use of an intermediary interface, i.e., a flexible circuit or lead frame connector. Moreover, the use of discrete transmitter and receiver optical subassemblies coupled to the transceiver represents a relatively complicated design that increases the complexity of the device.

In accordance with embodiments of the present invention, an integrated solution to the above challenges is disclosed. In particular and as has been briefly discussed above, integrated transmitter and receiver subassemblies are included in the transceiver 100 to enable the transmission and reception of optical signals to and from the transceiver 100. Specifically, the ITS 118 integrates the optical signal transmission functionality of a commonly known transmitter optical subassembly into the transceiver 100 itself, while the IRS 120 integrates the optical reception functionality of a commonly known receiver optical subassembly into the transceiver. This results in device simplification and reduced part count, and represents a significant departure from standard transceiver technology.

Figure 4:
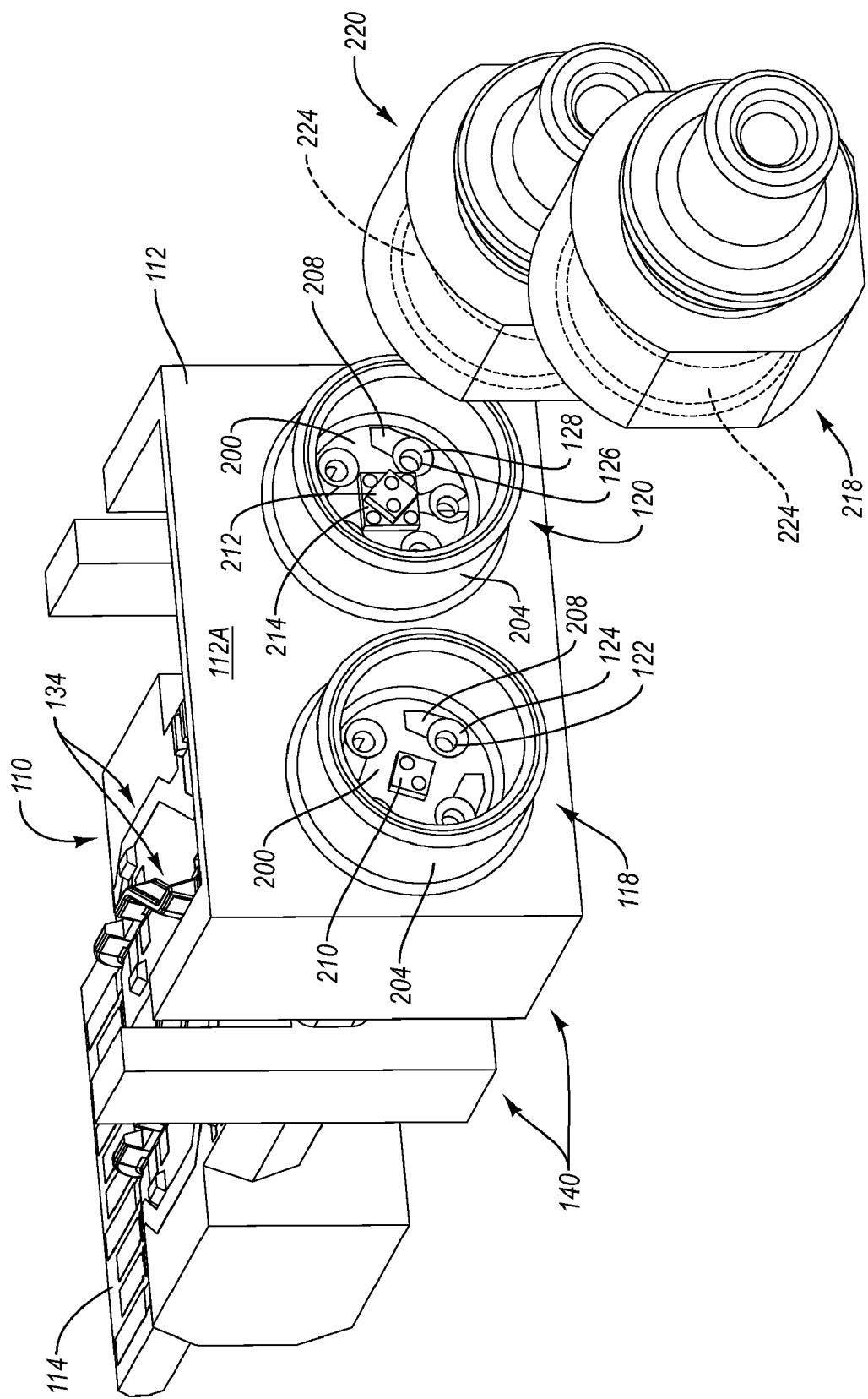
FIG. 4 is an exploded, perspective view of a molded communications module including integrated transmitter and receiver subassemblies, according to one embodiment of the present invention.
Figure 5:
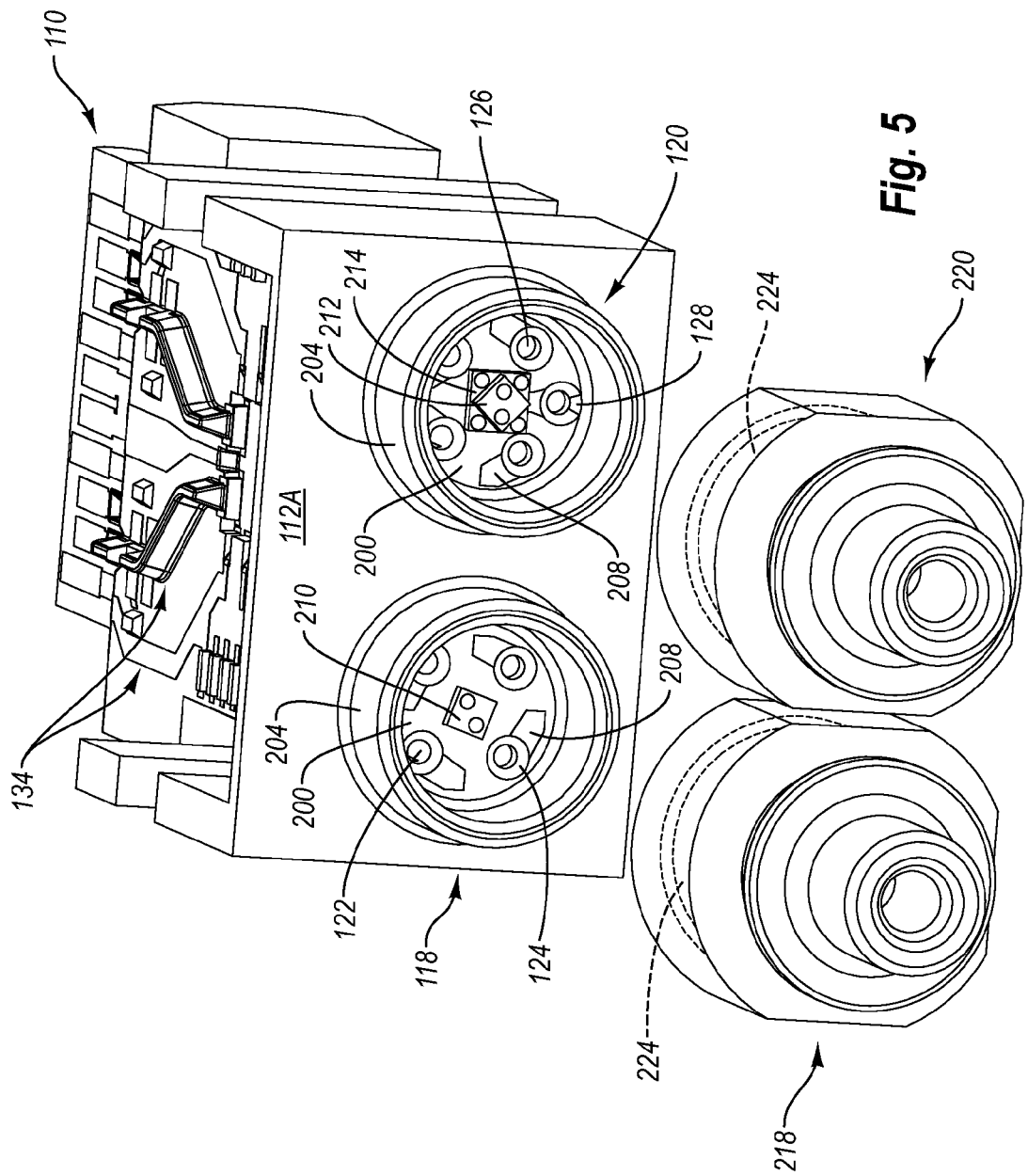
FIG. 5 is another exploded, perspective view of the molded communications module shown in FIG. 4.

As best seen in FIGS. 4 and 5, the ITS 118 and IRS 120 are similarly configured both in placement and structure, with some distinctions, as will be described. Both the ITS 118 and IRS 120 are primarily positioned on an exterior portion of the front end wall 112A of the transceiver body 110. Each of the ITS 118 and IRS 120 includes a mounting surface 200 surrounded by a cylindrical wall 204 that extends from the front end wall 112A. The mounting surfaces 200 are defined by portions of the front end wall 112A that are circumscribed by the cylindrical wall 204. Note that while cylindrical, the walls 204 can define other shapes as well, according to the particular configuration. It is also possible that the mounting surfaces of the ITS and IRS could be composed of an additional surface placed on the front end wall.

A plurality of wall holes is defined through the mounting surfaces 200 of both the ITS 118 and IRS 120. In particular, and as best seen in FIG. 5, four ITS wall holes 122 are defined through the mounting surface 200 of the ITS 118, while five IRS wall holes 126 are defined through the mounting surface of the IRS 120. Each wall hole includes a conductive surface to form conductive feedthroughs from the mounting surfaces 200 to the interior portion of the transceiver body 110. Specifically, the four wall holes 122 of the ITS 118 are conductively coated or plated to form ITS feedthroughs 124, while the five wall holes 126 of the IRS 120 are conductively coated or plated to form the IRS feedthroughs 128. Note that the number, shape, and particular placement of the wall holes and corresponding feedthroughs can be altered according to need or design. Also, other conductive through-structures can be utilized in place of the wall holes and feedthroughs as shown herein.

A plurality of conductive bonds pads 208 is also included within each cylindrical wall 204, as shown in FIGS. 4 and 5, wherein both the ITS 118 and IRS 120 include a bond pad proximate and electrically connected to a corresponding one of the feedthroughs 124 or 128. The bond pads 208 are configured to enable a wire bond or other electrical interconnection scheme to be electrically attached to the corresponding feedthrough 124 or 128, as will be further described below. The particular shape, length, and other characteristics of the bond pads can be as shown in the figures, or can be altered according to need or design.

Both the ITS 118 and IRS 120 include optoelectronic and other components needed to perform their respective duties of transmitting and receiving optical signals during transceiver operation. In detail, the ITS 118 includes a light source, such as a laser diode 210, that is affixed to the ITS mounting surface 200. The IRS 120 includes a photodetector ("PD") 212 mounted on a trans-impedance amplifier ("TIA") 214, which in turn is affixed to the IRS mounting surface 200.

Two optical fiber ports are included with the transceiver 100 and configured for attachment with the ITS 118 and IRS 120. In particular, a transmitter optical fiber port 218 is included for attachment with the ITS 118, while a receiver optical fiber port 220 is included for attachment to the ITS 120. Each fiber port 218 and 220 includes a cavity 224 sized and configured to receive therein the cylindrical wall 204 of the respective ITS 118 and IRS 120. The cavity 224 and wall 204 can be sized so as to provide limited clearance therebetween. An epoxy or other suitable adhesive is applied between the surface of the cavity 224 and corresponding outer surface of the cylindrical wall 204 to enable mating of each fiber port 218, 220 with the corresponding ITS 118, IRS 120, thereby mating the fiber ports to the transceiver 100. Alternatively, the cavity 224 and wall 204 can be sized so as to establish a relative friction, or interference, fit therebetween. Note that the corresponding shapes of the cylindrical walls 204 and corresponding fiber port cavities 224 can be altered from that shown in FIGS. 4 and 5 to suit any particular application. For instance, square, hexagonal, or other shapes could be defined. In one embodiment, the cylindrical walls could be omitted altogether, and the fiber ports attached to the front end wall 112A directly.

The laser diode 210 and PD 212/TIA 214 are precisely aligned and positioned on the mounting surfaces 200 of their respective ITS 118 and IRS 120 so as to maximize their optical coupling with optical fiber cables (not shown) that are operably attached to a respective one of the fiber ports 218, 220. This alignment of the laser diode 210 and PD 212/TIA 214 can be achieved through active or passive alignment techniques, and can be performed with each component individually, or with both devices simultaneously. One alignment technique that can be adapted for use with the present system described herein is found in U.S. Pat. No. 6,955,482 B2, issued Oct. 18, 2005, and entitled "Optical Transceiver Having a Single Optical Subassembly," which is incorporated herein by reference in its entirety.

Note that, while they are centered within the respective cylindrical wall 204, the laser diode 210 and PD 212 can be positioned off-center with respect to the cylindrical wall, if desired.

The laser diode 210, PD 212, and TIA 214 are electrically connected to one or more of the bond pads 208 of the respective feedthroughs 124/128 so as to permit electrical communication between these components and a host device (not shown) via the transceiver 100. Electrical communication between conductive contact points on the laser diode 210, PD 212, and TIA 214 and the bond pads 208 of the respective ITS 118 and IRS 120 is achieved in the present embodiment by the use of wire bonds (not shown) extending between the contact points and the bond pads. In addition to wire bonds, however, other connective interfaces could alternatively be employed, as may be appreciated by one skilled in the art.

As mentioned, the feedthroughs 124, 128 of the ITS 118 and IRS 120, respectively, pass through the front wall 112 of the transceiver body 110 via the ITS wall holes 122 and IRS wall holes 126. As best seen in FIGS. 1A and 1B, the wall holes 122, 126 and corresponding feedthroughs 124, 128 are arranged such that some of the feedthroughs are disposed on the top body surface 110A and some on the bottom body surface 110B. Once past the front wall 112 into the interior portion of the transceiver body 110, each of the ITS and IRS feedthroughs 124, 128 electrically connect with a corresponding one of front end top traces 134E or front end bottom traces 134F. The traces 134E, 134F are produced as a result of the laser direct structuring process described above, and are configured to electrically connect with other components or features of the transceiver 100, host device, or other structure.

Note that in the present embodiment, pairs of the front end top traces 134E are positioned on opposite vertical sides of third and fourth ridges 160C or 160D, which in turn are defined on the top transceiver body surface 110A. The structure and operation, including broadside coupling, of the ridges 160C/160D and traces 134E are similar to that described in connection with the first and second ridges 160A/160B and the data signal trace pairs 134A/134B. In the configuration just described, operable communication is established between the laser 210, PD 212, and TIA 214 and conductive features of the transceiver body 110. Of course, the particular details of this configuration could be altered from what is explicitly shown while still residing within the scope of the present invention. For instance, while the feedthroughs are shaped to define half-cylinder concave surfaces, as best seen in FIGS. 1A and 1B, the feedthroughs can define other shapes that may be suited to a particular application.

Note again that the present design as shown and described herein integrates the functionality of known optical subassemblies into the transceiver itself, thereby obviating the need for discrete optical subassemblies and intervening structures, such as flex circuits and lead frames, needed to connect such subassemblies to the transceiver.

Note that the ITS and IRS can be configured so as to be hermetically sealed. This may be accomplished in one embodiment by the placement of a cap (not shown) over the cylindrical wall 204 and the filling in of the ITS and IRS wall holes defined in the mounting surfaces thereof with an appropriate sealant, such as epoxy or glass. Or, a submount could be placed on the mounting surfaces of the ITS and IRS so as to seal the bases thereof from the interior portion of the transceiver body, before adding a cap to cover the ITS and IRS. Of course, other sealing configurations could also be configured to provide a hermetic environment. Also, the ITS and IRS can be configured such that no hermeticity is required.

Figure 6:
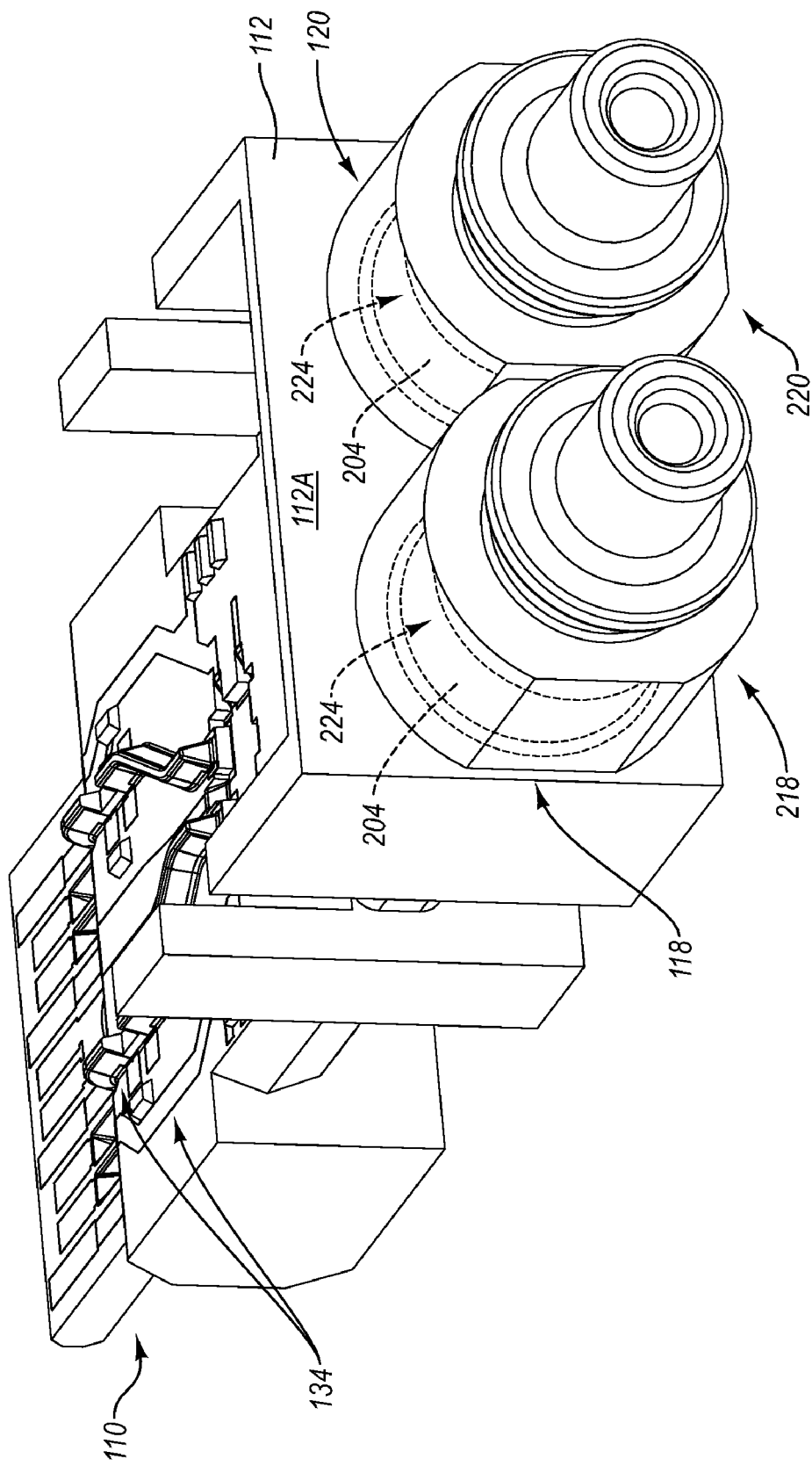
FIG. 6 is a perspective view of the molded communications module of FIG. 4 in an assembled state, according to one embodiment.

FIG. 6 shows the transceiver 100 with the transmitter and receiver optical fiber ports 218, 220 attached to the ITS 118 and IRS 120 in the manner described above. In this configuration, the fiber ports 218, 220 are positioned and prepared to receive connectorized optical fiber cables in order to interconnect the transceiver 100 with a communications network, for instance. Note also that a cover (not shown) can be placed about the transceiver 100 shown in FIG. 6 so as to protect the circuits and components of the transceiver.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical transceiver module, comprising:
a molded plastic body including a three-dimensional molded structure included thereon, the three dimensional molded structure including a sunken component pocket configured such that when the component is placed in the pocket a top surface of the component is substantially level with a top body surface enabling electrical connections thereto of minimum length to be established between selected traces that terminate at the component pocket and conductive pads positioned on the component; an integrated optical subassembly (OSA), including: a molded plastic mounting surface defined on a vertical portion of the molded body; a molded plastic wall extending about the mounting surface; at least one optoelectronic device positioned on the molded plastic mounting surface; a plurality of bond pads included on the molded plastic mounting surface in electrical connection with the at least one optoelectronic device; a plurality of conductive feedthroughs defined through the molded plastic mounting surface, each feedthrough being in electrical communication with a corresponding one of the bond pads, wherein the plurality of conductive feedthroughs are arranged such that some of the conductive feedthroughs are in communication with one or more conductive features disposed on a top surface of the molded plastic body and some of the conductive feedthroughs are in communication with one or more conductive features disposed on a bottom surface of the molded plastic molded body, wherein one or more conductive features are configured to run around an edge of the molded plastic body from the top surface of the molded plastic body to the bottom surface of the molded plastic body; and an optical fiber port that engages the molded plastic wall extending about the mounting surface, wherein the optical fiber port is configured for receiving an optical fiber cable.

2. The optical transceiver module in accordance with claim 1, further comprising conductive features defined on portions of the molded plastic body.

3. The optical transceiver module in accordance with claim 2, wherein each feedthrough is further in electrical communication with at least one of the conductive features on the molded plastic body.

4. The optical transceiver module in accordance with claim 1, wherein each bond pad is electrically connected with the at least one optoelectronic device via a wire bond.

5. The optical transceiver module in accordance with claim 1, wherein the molded plastic wall extending above the mounting surface is cylindrical.

6. The optical transceiver module in accordance with claim 1, wherein the at least one optoelectronic device is one of a laser diode or a photodiode mounted on a transimpedance amplifier.

7. The optical transceiver module in accordance with claim 1, wherein the fiber port defines a cavity sized to receive therein the molded plastic wall extending above the molded plastic mounting surface.

8. The optical transceiver module in accordance with claim 1, wherein the molded plastic wall extending above the molded plastic mounting surface is omitted and the fiber port directly engages the molded plastic mounting surface.

9. The optical transceiver module in accordance with claim 1, wherein the integrated optical subassembly is a first integrated OSA, the molded plastic mounting surface is a first mounting surface, the molded plastic wall is a first wall, the optoelectronic device is a first device, the plurality of bond pads are a first plurality of bond pads, the plurality of conductive feedthroughs are a first plurality of conductive feedthroughs, and the optical fiber port is a first optical fiber port, the optical transceiver further comprising:
　a second integrated optical subassembly (GSA), including:
　　a second molded plastic mounting surface defined on a vertical portion of the molded body;
　　a second molded plastic wall extending about the mounting surface;
　　at least one second optoelectronic device positioned on the second mounting surface
　　a second plurality of bond pads included on the second mounting surface, each bond pad being configured to electrically connect with the at least one second optoelectronic device;
　　a second plurality of conductive feedthroughs defined through the molded plastic mounting surface, each second feedthrough being in electrical communication with a corresponding one of the second plurality bond pads, each second feedthrough further being in electrical communication with at least one conductive feature defined on the molded body; and
　　a second optical fiber port that engages the wall extending about the second mounting surface, the second optical fiber port being configured for receiving an optical fiber cable.

10. The optical transceiver module in accordance with claim 9, wherein the first and second molded plastic mounting surfaces are defined on a vertical portion defining the front wall of the optical transceiver.

11. An integrated transmit optical subassembly for use with an optical transceiver module having a molded plastic body, one or more conductive features being defined on portions of the molded plastic body, the integrated transmit optical subassembly comprising:
　the molded plastic body:
　a molded plastic mounting surface defined on a vertical portion of the molded plastic body;
　a molded plastic wall extending about the mounting surface;
　a laser diode positioned on the molded plastic mounting surface;
　a plurality of bond pads included on the molded plastic mounting surface in electrical connection with the laser diode;
　a plurality of conductive feedthroughs defined through the molded plastic mounting surface, each feedthrough being in electrical communication with a corresponding one of the bond pads, each feedthrough further being in electrical communication with at least one conductive feature on the molded plastic molded body, wherein the plurality of conductive feedthroughs are arranged such that some of the conductive feedthroughs are in communication with one or more conductive features disposed on a top surface of the molded plastic body and some of the conductive feedthroughs are in communication with one or more conductive features disposed on a bottom surface of the molded plastic molded body, wherein one or more conductive features are configured to run around an edge of the molded plastic body from the top surface of the molded plastic body to the bottom surface of the molded plastic body; and
　an optical fiber port that engages the molded plastic wall extending about the mounting surface, wherein the optical fiber port is configured for receiving an optical fiber cable, wherein the plastic body is a single molded piece integral with the molded plastic mounting surface, molded plastic wall.

12. The integrated transmit optical subassembly in accordance with claim 11, wherein the fiber port defines a cavity sized to receive therein the molded plastic wall extending above the molded plastic mounting surface.

13. The integrated transmit optical subassembly in accordance with claim 11, wherein the molded plastic wall extending above the molded plastic mounting surface is omitted and the fiber port directly engages the molded plastic mounting surface.

14. The integrated transmit optical subassembly in accordance with claim 11, wherein the integrated transmit optical subassembly is configured so as to be hermetically sealed.

15. An integrated receive optical subassembly for use with an optical transceiver module having a molded plastic body, one or more conductive features being defined on portions of the molded plastic body, the integrated transmit optical subassembly comprising:
　the molded plastic body including a three dimensional feature, the three dimensional feature including a vertical ridge defined on the body and including a data signal trace pair disposed on opposite sides of the vertical ridge:
　a molded plastic mounting surface defined on a vertical portion of the molded plastic body;
　a molded plastic wall extending about the molded plastic mounting surface;

a photodiode atop a trans-impedance amplifier, the trans-impedance amplifier being positioned on the molded plastic mounting surface;

a plurality of bond pads included on the molded plastic mounting surface in electrical connection with the photodiode or trans-impedance amplifier;

a plurality of conductive feedthroughs defined through the molded plastic mounting surface, each feedthrough being in electrical communication with a corresponding one of the bond pads, each feedthrough further being in electrical communication with at least one conductive feature on the molded plastic body; and an optical fiber port that engages the molded plastic wall extending about the molded plastic mounting surface, wherein the optical fiber port is configured for receiving an optical fiber cable, wherein the plastic body is a single molded piece integral with the molded plastic mounting surface, molded plastic wall.

16. The integrated receive optical subassembly in accordance with claim 15, wherein the fiber port defines a cavity sized to receive therein the molded plastic wall extending above the molded plastic mounting surface.

17. The integrated receive optical subassembly in accordance with claim 16, wherein the molded plastic wall extending above the molded plastic mounting surface is omitted and the fiber port directly engages the molded plastic mounting surface.

18. The intergrated receive optical aubassembly in accordance with claim 15 wherein the integrated receive optical subassemblt is configured so as to be hermetically sealed.

19. The integrated receive optical subassembly in accordance with claim 15, wherein the plurality of conductive feedthroughs are arranged such that some of the conductive feedthroughs are in communication with one or more conductive features disposed on a top surface of the molded plastic body and some of the conductive feedthroughs are in communication with one or more conductive features disposed on a bottom surface of the molded plastic body.

20. The optical transceiver module in accordance with claim 1, wherein the plastic resin is a liquid crystal polymer with a catalyst intermixed therein.

21. The optical transceiver module in accordance with claim 20, wherein the catalyst is composed substantially of palladium.

22. The integrated receive optical subassembly in accordance with claim 16, the three dimensional feature further comprising a trough defined on the top surface of the molded plastic body, the ridge being positioned in the trough to enable the ridge to extend into the molded plastic body as not to exceed an industry standard thickness.

* * * * *